(12) United States Patent
Hogervorst

(10) Patent No.: US 11,618,600 B2
(45) Date of Patent: Apr. 4, 2023

(54) BALING PRESS WITH ROPE KNOTTER

(71) Applicant: Bollegraaf Patents and Brands B.V., Appingedam (NL)

(72) Inventor: Wouter Hendrik Hogervorst, Dalerpeel (NL)

(73) Assignee: BOLLEGRAAF PATENTS AND BRANDS B.V., Appingedam (NL)

( * ) Notice: Subject to any disclaimer, the term of this patent is extended or adjusted under 35 U.S.C. 154(b) by 0 days.

(21) Appl. No.: 17/372,595

(22) Filed: Jul. 12, 2021

(65) Prior Publication Data
US 2022/0033119 A1    Feb. 3, 2022

(30) Foreign Application Priority Data
Jul. 30, 2020 (EP) .................................. 20188676

(51) Int. Cl.
*B65B 13/22*    (2006.01)
*B65B 13/26*    (2006.01)
*B30B 9/30*     (2006.01)
*A01F 15/14*    (2006.01)

(52) U.S. Cl.
CPC ............ *B65B 13/26* (2013.01); *B30B 9/3003* (2013.01); *B65B 13/22* (2013.01); *A01F 15/14* (2013.01)

(58) Field of Classification Search
CPC ....... B65B 13/06; B65B 13/18; B65B 13/184; B65B 13/22; B65B 13/26; B65B 27/12; B65B 41/10; B65B 41/12; B65B 41/16; B65B 63/028; A01F 15/0825; A01F 15/04; A01F 15/14; B30B 9/3003; B30B 9/3025
See application file for complete search history.

(56) References Cited

U.S. PATENT DOCUMENTS

| 208,137 A | 9/1878 | Appleby |
| 591,614 A | 10/1897 | Appleby |
| 744,153 A | 11/1903 | Appleby |
| 2,277,394 A | 3/1942 | Everhart et al. |

(Continued)

FOREIGN PATENT DOCUMENTS

| DE | 2253160 | 5/1973 | |
| DE | 2759976 | 7/1982 | |
| DE | 102018104050 A1 * | 8/2019 | ............. A01F 15/14 |

(Continued)

OTHER PUBLICATIONS

Extended European Search Report for corresponding European Application No. 20188676.9 dated Jan. 12, 2021, 6 pages.

*Primary Examiner* — Jimmy T Nguyen
(74) *Attorney, Agent, or Firm* — Pearne & Gordon LLP

(57) ABSTRACT

A baling press having a rope tying system with a loop supply member for forming a loop of the second rope material across the bale pressing channel to the first side of the bale pressing channel and a loop of the first rope material at the first side. The loop supply member is suspended on the second side of said bale pressing channel and movable along a straight path between an extended position projecting across the bale pressing channel and a retracted position. The loop supply member has a turn guide for forming and guiding the loops in the first and second rope materials and a spreader for, when the loop supply member is in the extended position, holding the rope materials guided so that portions in the knotting area are spaced from a free end portion of the loop supply member.

14 Claims, 6 Drawing Sheets

(56) References Cited

U.S. PATENT DOCUMENTS

2015/0298837 A1\* 10/2015 García Navarro ...... B65B 13/26
100/17

FOREIGN PATENT DOCUMENTS

| EP | 1190618 | 3/2002 |
| EP | 2496070 | 9/2012 |
| EP | 2941951 | 11/2015 |
| FR | 2372732 | 6/1978 |
| JP | 2017171353 | 9/2017 |
| WO | 93/13988 | 7/1993 |

\* cited by examiner

BALING PRESS WITH ROPE KNOTTER

FIELD AND BACKGROUND OF THE INVENTION

The invention relates to a baling press with a rope knotter.

Knotting mechanisms for tying a rope around a bale pressed in a baling press have been known for more than a century. Compared with tying bales with steel or plastic wire material, tying bales with rope provides the advantage that a wider range of generally lower cost materials are available and that rope material is generally more robust in practice, since a smaller reduction of the tensile strength is caused by knots and sharp bends. Furthermore, when baling waste material, rope material can be made of material, such as a suitable polymer, which can be recycled with the waste material. The flexibility of rope material and its capability of accommodating to deformations by redistributing loads over the strands is advantageous for robustness, but makes connecting ends of rope material more difficult than connecting ends of wire material. While ends of wire material can be connected by twisting the ends about each other, connecting rope material without using additional connecting members, such as clamps, requires knotting.

A particularly well-known knotter is the Appleby knotter, which allows mechanical knotting of twined rope material. Such a knotter is disclosed in U.S. Pat. Nos. 208,137, 591,614 and 744,153. More recent applications of knotters of this type in baling presses are disclosed in German patent specification 27 59 976 and European patent application 1 190 618. Such knotters have been developed for and widely applied in the field of harvesting machines for tying bales of hay and straw.

Examples of baling presses with mechanisms for guiding ropes to the knotter are disclosed in U.S. Pat. No. 591,614, German patent specification 27 59 976 and European patent application 1 190 618. In such baling presses, the knotter is arranged at a first side of a bale pressing channel and a first rope material is fed at the first side of the bale pressing channel. A second rope material is fed at the second side of the bale pressing channel opposite of the first side. Each time a bale has been pressed, a curved loop supply arm is swung, generally about a center of curvature of the curved arm, from the second side of the bale pressing channel to the first side along a trailing end face of the pressed bale and forming and supplying a loop of the second rope material to the first side of the bale pressing channel, where the second rope material and the first rope material are engaged in a knotting area and knotted together by the knotter, thereby closing a loop of the first and the second rope material at the trailing end of the pressed bale. The curved shape of the supply arm causes a section of the loop of the second rope material extending from a turning sheave at the supply arm to an edge of a formed bale at the second side of pressing channel to extend along a trajectory leaving a spacing between the supply arm and the loop, which allows that section of the second rope material to be engaged by the knotter. After the knot has been made, the formed knot is cut off the more upstream rope materials, of which free ends are held at the knotter. The loop supply arm is then retracted and a section of the first rope material is pressed towards a section of the second rope material extending through knotting area, where the first rope material and the second rope material are again engaged in the knotting area and knotted together by the knotter, thereby creating a loop of the first and the second rope material to be formed around the leading end of next bale to be pressed. Thus, sections of the first and the second rope material have to be presented in the knotting area twice, first for forming the knot at the trailing end and subsequently, after the first knot has been cut off from the rope material, for forming the knot at the leading end of the next bale.

A disadvantage of such baling presses compared with baling presses arranged for tying bales with steel or plastic wire material is that a larger space is required for the movement of the supply arm and that access to the knotter for inspection, maintenance and troubleshooting is quite difficult.

In European Patent 2 941 951, a baling press is disclosed in which the problem of the supply arm movement requiring a large space is solved by linear movement of a loop supply member suspended at the first side of the pressing channel instead of at the second side of the pressing channel.

SUMMARY OF THE INVENTION

It is an object of the present invention to provide a baling press in which the supply arm occupies less space than in known baling presses with a pivoting curved supply arm that allows knotting twined rope material around bales.

Because the loop supply member is suspended on the second side of the bale pressing channel, the loop supply member is movable along a path between an extended position in which the loop supply member projects from the second side across the bale pressing channel to the first side of the bale pressing channel and a retracted position in which the loop supply member is fully on the second side of the bale pressing channel, and the loop supply member is guided so that the path is straight, the path of movement of the loop supply member occupies little space in the bale pressing channel.

The knot tier, the cutter and the rope clamp can nevertheless reliably engage the first and second rope materials to be knotted to each other, without hitting the loop supply member in the extended position, because the loop supply member has a free end portion adjacent to the turn guides and a spreader for, when the loop supply member is in the extended position, holding the rope materials guided along trajectories extending from the turn guide through the knotting area towards the bale pressing channel, portions of the trajectories in the knotting area being spaced from the free end portion.

Compared with the baling press arranged for linear movement of a loop supply member suspended at the first side of the pressing channel, guiding of the rope materials to the knotting area is achieved with a more simple construction, in which the need of catching the second rope material on the second side of the pressing channel, which requires accurate adjustment and control over the second rope material, is obviated, the rope supply member needs to be moved back and forth between two positions only and the knots can be made closer to the bale for obtaining tightly tied bales, because the clamping of the ropes for holding rope material cut off from the knotted rope sections, after making the first knot and after making the second knot of a bale, can in both instances be in a clamping position at a distance further from the bale pressing channel than the distance of the knotting area to the bale pressing channel.

Particular elaborations and embodiments of the invention are set forth in the dependent claims.

Further features, effects and details of the invention appear from the detailed description and the drawings.

DETAILED DESCRIPTION

Figure 1:
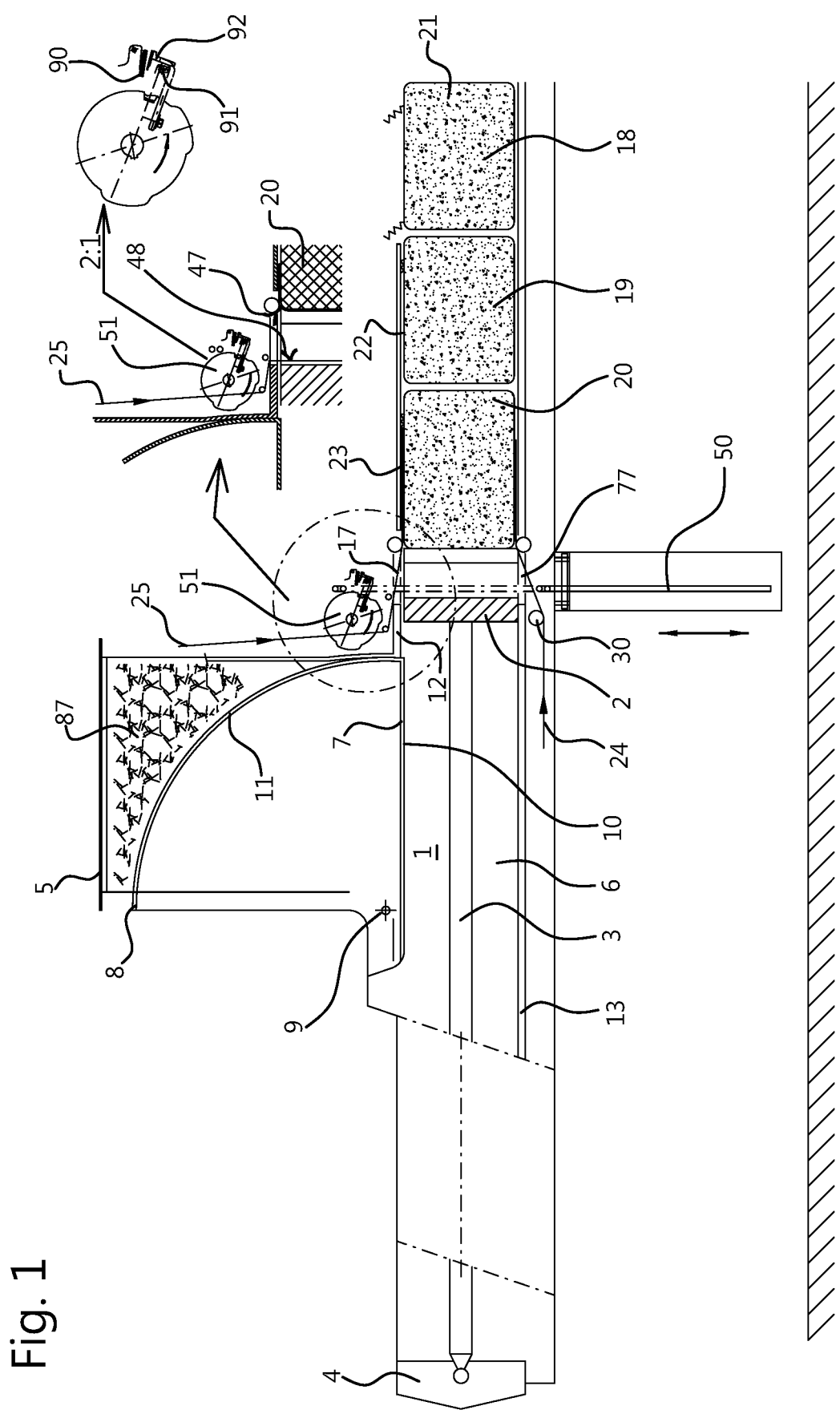
FIG. 1 is a schematic side view of a first example of a baling press according to the invention.

In FIG. 1 an example of a baling press according to the invention is shown. The baling press shown has a pressing channel 1 in which a ram 2 is displaceable by a hydraulic cylinder 3 mounted between the ram 2 and a suspension bracket 4. A feeding chute 5 communicates with a pressing chamber area 6 of the pressing channel 1 via a passage 7 forming a downstream end of the feeding chute 5. The pressing chamber 6 is defined by the stroke volume of a face of the ram 2 facing in pressing direction.

A prepress valve 8 is pivotable about a pivotal axis 9 and has a flat wall 10 which, in the closed position shown, closes off the passage 7 from the feeding chute 5 to the pressing channel 1 and, in opened position, is retracted in a wall of the feeding chute 5. The prepress valve 8 furthermore has a surface 11 substantially curved around the pivotal axis 9, which surface closes off the feeding chute 5 in axial direction when the prepress valve 8 is in closed position.

Material 17 to be pressed may already be deposited into the feeding chute 5, while the prepress valve 8 is closed. When the prepress valve 8 is opened, all or a portion of the material to be pressed drops into the pressing chamber 6 and may form a pile aside the prepress valve 8. When the prepress valve 8 is closed again after a pile has formed aside the prepress valve 8, a volume of the material is precompressed in the pressing chamber 6 by the closing of the prepress valve 8. Next, the pressing ram 2 is moved to its most forward position compressing the precompressed material while simultaneously new material to be pressed can be deposited into the feeding chute 5 on top of the closed prepress valve 8.

Depending on the compressibility of the material 17, compressing of a volume of material for forming a bale 18-20 may require several cycles of retracting the ram 2 in a direction opposite to the pressing direction, feeding material with the prepress valve 8 open, closing the prepress valve 8 while optionally prepressing and compressing by advancing the ram in pressing direction. Thus, each bale may be obtained by a single stroke or by a plurality of compression cycles of the pressing ram 2 each time compressing material newly fed into the pressing chamber 6.

Counter pressure in the pressing channel 1 against which a bale is pressed in the pressing chamber 6 and pushed out of the pressing chamber 6 is obtained by resistance encountered by the material of previously compressed material formed into bales 18, 19, 20 as it is pressed through the pressing channel 1 while compressed between top and bottom walls 12, 13 and side walls of the pressing channel 1. To that end, the pressing channel 1 may for instance have a cross-section that decreases in downstream direction over at least a portion of its length and/or one or more walls of at least a downstream portion of the pressing channel may resiliently be pressed inwardly. Initial counter pressure may be obtained by mounting obstacles in the pressing channel 1 that are pressed out by the first bale.

For facilitating separation of compressed material into discrete bales and for facilitating manipulation, transport and in particular for preventing bales from falling apart, loops 21, 22 of rope material are tied around each bale 18-20. In FIG. 1, a loop 23 around a most recently compressed bale 20 has not yet been completed. The rope material may for instance be plastic or natural fiber material that may be twisted or braided and may include one or more strands of twisted fiber material. The rope material is tied by knotting.

The baling press according to the present example is equipped with a plurality of rope tying systems for tying a corresponding number of mutually parallel loops 21-23 around each of the bales 18-20. The rope tying systems are arranged next to each other in a row oriented horizontally and transverse to the longitudinal direction of the bale pressing channel 1. Dependent on the width of the bale pressing channel 1, the number of rope tying systems may for instance be four, five or six, but a higher or lower number of parallel rope tying systems, or a single rope tying system, may be provided. For ease of understanding, the description below describes one of the rope tying systems.

The rope tying system has a first rope feeding structure for feeding first rope material 25 from a first side of the bale pressing channel 1 and a second rope feeding structure for feeding second rope material 24 at a second side of the bale pressing channel 1 opposite of the first side of the bale pressing channel 1. In this example, the first side is the upper side of the bale pressing channel and the second side is the lower side of the bale pressing channel, which is advantageous for obtaining a baling press having a small footprint. However, the first side may also be the left, right or lower side of the bale pressing channel, the second side would then be the right, left or, respectively upper side of the bale pressing channel. Providing that the first and second sides are opposite lateral sides of the baling press is advantageous for facilitating installation of the baling press, because there is no need to provide room under the bale pressing channel for the loop supply member or the knotting system. The rope tying system further has a knotter 51 at the first side of the bale pressing channel 1.

Figure 2:
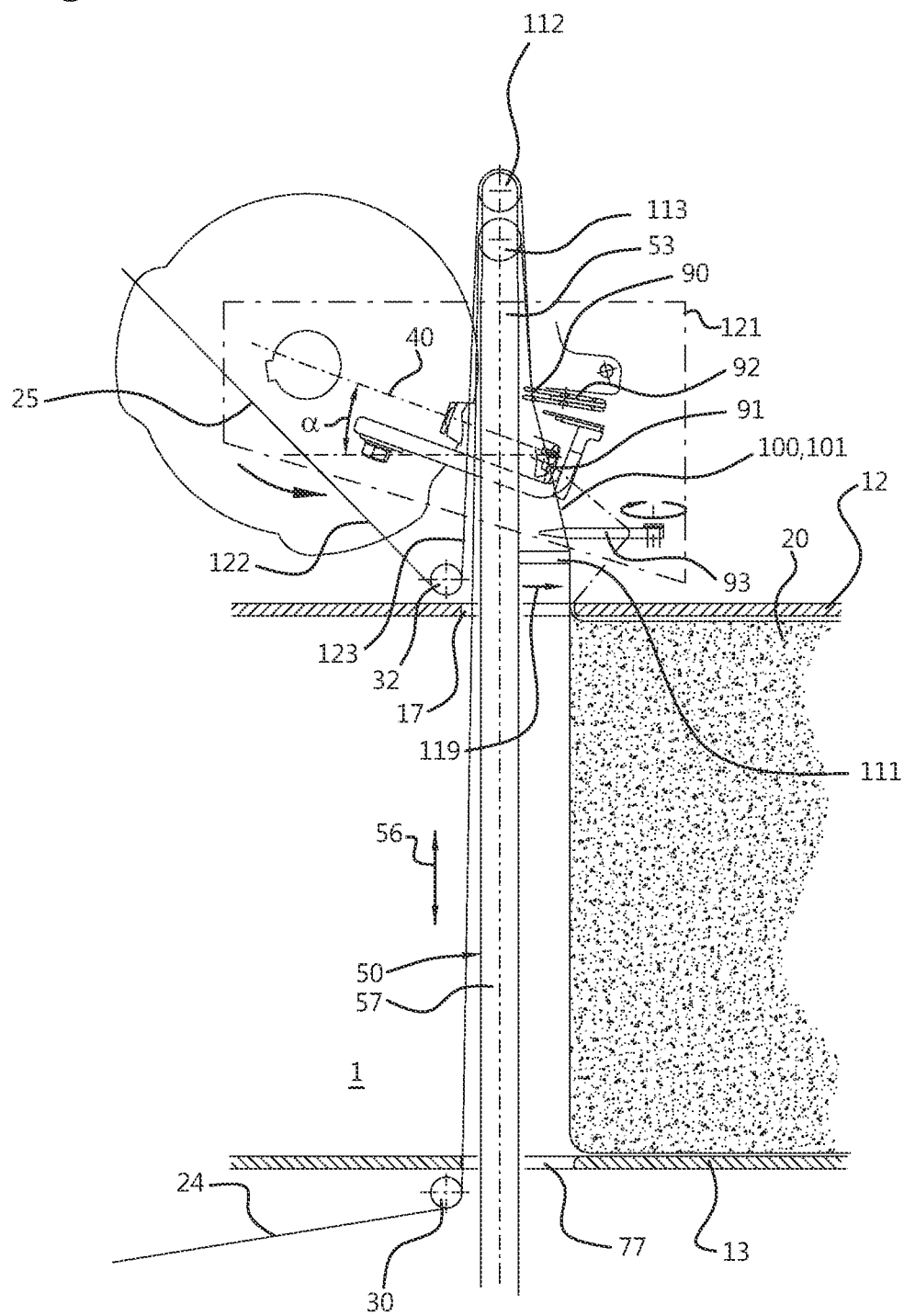
FIGS. 2 and 3 are schematic side views of a portion of the baling press according to FIG. 1 in two stages of operation.
Figure 3:
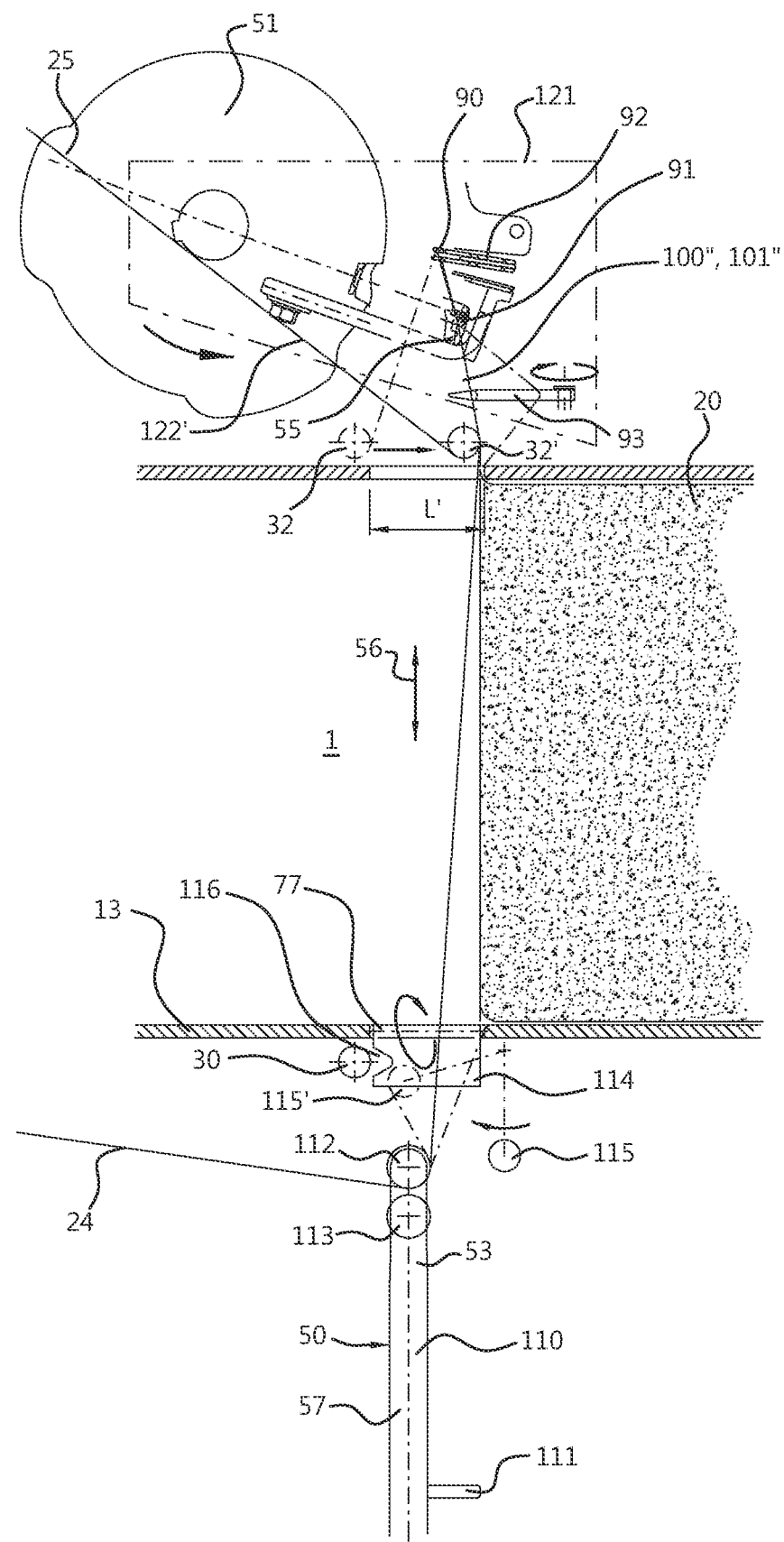

The loops 21-23 are each formed of the first rope material 25 and the second rope material 24. The rope tying system further includes a lower guide roller 30 located closely along the bottom of the bale pressing channel 1, for guiding the second rope material 24 fed from respective spool into the bale pressing channel 1 and a loop supply member 50, here in the form of a rod, equipped with turn guides 112, 113 at free ends thereof. The first and second rope materials pass over the turn guides 112, 113. The loop supply rod 50 is suspended on the second, lower side of the bale pressing channel 1 and is movable between an extended, uppermost position (FIG. 2) and a retracted, lowermost position (FIGS. 1 and 3). In the extended position, the rod 50 extends from the second, lower side of the bale pressing channel 1 across the bale pressing channel 1 to the first, upper side of the bale pressing channel 1, for forming and guiding a loop of the second rope material 24 extending across the bale pressing channel 1 to the first side of the bale pressing channel 1 and a loop of the first rope material 25 at the first side of the bale pressing channel 1. The loop of lower rope material 24 is pushed from adjacent to the bottom of the bale pressing channel 1 to the top side of the bale pressing channel 1 by an inner (proximal) one of the turn guides 113 and the loop of the first rope material 25 at the top side of the bale pressing channel 1 is pushed in a direction away from guide rollers 32 arranged the first side of the pressing channel 1 and away from the pressing channel 1 by an outer (distal) one of the turn guides 112. Thus, two loops close together in a generally common plane oriented parallel and perpendicular to the pressing direction are obtained.

Each time after a bale 20 has been pushed out of the pressing chamber 6, the loop supply rod 50 is extended from the retracted position into the extended position, thereby pushing the second rope material 24 through an opening 77 in the bottom wall 13 and through an opening 17 in the top wall 12 of the bale pressing channel 1, into a loop projecting out of the bale pressing channel 1 on the first (upper) side thereof. During the extension movement, the supply rod 50 also entrains the upper rope material 25 into a loop so that the temporary loops of first and second rope material 24, 25 extend through knotting area 55 of knotter 51.

The knotter 51 is positioned and arranged for engaging the first and second rope material 24, 25 in the knotting area 55 of that knotter 51. In operation, each time after a bale has been pressed, a first knots 47 connecting the supplied first rope material 25 to the supplied second rope material 24 is tied in a section 100, 101 of the first and second rope materials 24, 25 adjacent to a trailing end of the pressed bale (see FIG. 2). Next, the knotted sections of the first and second rope material 24, 25 are cut off from more upstream sections of the first and second rope material 24, 25 and the knotter 51 holds the free ends of supplied rope material 24, 25. Subsequently, a next knot 48 tying the free ends of the supplied first and second rope material 24, 25 to each other is knotted in a section 100', 101' of the first and second rope materials 24, 25 (see FIG. 3) and pulled taut so that the knot 48 ends up at the top or front of a next bale that is pressed (see FIG. 1). The knotter 51 can for instance be a knotter as described in European patent application 2 496 070. Such knotters are commercially available from for instance Rasspe Systemtechnik GmbH & Co. KG, Wermelskirchen, Germany. The infeed of the second rope material 24 for the loop around of the next bale, is also through the openings 77 in the bottom wall 13 of the bale pressing channel 1 and the infeed of the first rope material 25 for the loop around of the next bale, is also through the openings 17 in the top wall 12 of the bale pressing channel 1.

The knotter 51 has a rope clamp 90 for holding the first and second rope materials 24, 25 while the first knot 47 is made and until the second knot 48 is being made, a knot tying beak 91 for engaging the rope materials 24, 25 and forming full loops therein and for pulling loose ends of the rope materials 24, 25, obtained when the rope materials 24, 25 are cut by a cutter arm 92, through the formed loops. The loops are simultaneously slid off the knot tying beak 91 over the loose ends of the rope materials 24, 25 by the cutter arm 92. Thereby, the knot is completed.

The first and second knot of each bale can both be made closer to the bale for obtaining tightly tied bales than in a baling press of which the loop supply member is suspended at the same side of the baling press channel as the knotter, because the position where the rope materials 24, 25 is clamped for holding rope material 24, 25 cut off from the knotted rope sections, after making each of the first and the second knots 47, 48 of each bale 18-20, is in both instances in a position at a distance further from the bale pressing channel 1 than the distance of the knotting area 55 to the bale pressing channel 1.

The knotter 51 further includes a guide 93 arranged between the knot tying beak 91 and the respective opening 17 in the bale pressing channel 1 for tightly holding the rope material in a line from the rope clamp 90 along the knotting beak 91, so that the rope materials 24, 25 are engaged reliably by the knotting beak 91.

The loop supply member 50 is movable along a path between the extended and retracted positions and guided so that this path is straight. Thus, the path of movement of the loop supply member occupies little space in the bale pressing channel.

The supply member 50 has a free end portion 53 adjacent to the turn guides 112, 113 and a spreader 111 for, when the loop supply member 50 is in the extended position, holding the rope materials 24, 25 guided along trajectories 100, 101 extending from the turn guides 112, 113 through the knotting area 55 towards the bale pressing channel 1, portions of the trajectories 100, 101 in the knotting area 55 each being spaced from the free end portion 53. The spacings between the trajectories 100, 101 and the free end portions 53 of the loop supply member 50 in the extended position allow the knot tying beak 91, the cutter 92 and the rope clamp 90 to reliably engage the first and second rope materials 24, 25 to be knotted to each other, without hitting the loop supply member 50 in the extended position, in spite of the path of movement of the loops supply member 50 between the retracted and extended position being straight.

If, as in this example, a guide 93 is arranged between the knot tying beak 91 and the respective opening 17 in the bale pressing channel 1, the spacings between the trajectories 100, 101 and the free end portions 53 of the loop supply member 50 in the extended position also allows the guide 93 to reliably engage the first and second rope materials 24, 25 without hitting the loop supply member 50 in the extended position.

For reliable engagement of the rope materials in the knotting area 55, the spacing between the trajectories 100, 101 and the free end portion 53 of the loop supply member is preferably at least 0.5 cm and more preferably at least 1 cm, while for keeping required space bale pressing channel 1 small, this spacing is preferably smaller than 15 cm and more preferably smaller than 10 cm.

For keeping required space in the bale pressing channel 1 small, it is furthermore advantageous that the free end portion 53 of the loop supply member 50 is elongated in a direction 56 of movement of the loop supply member 50 along said path between the extended position and the retracted position.

The loop supply member 50 includes a rod 57 which is straight and oriented in a direction 56 of movement of the loop supply member between the extended position and the retracted position and the spreader 111 projects from the rod 57 in a location between the knotting area 55 and the bale pressing channel 1 when the loop supply member 50 is in the extended position. Thus, the loop supply member is of a simple construction and its path of movement occupies little space in the bale pressing channel 1. Furthermore, the spreader 111 thus guides the first and second rope materials 24, 25 close to the knotting area 55, which contributes to reliable engagement of the first and second rope materials.

For keeping required space in the bale pressing channel 1 small, it is furthermore advantageous that the path of movement of the loop supply member is oriented in a direction 56 substantially perpendicular to the pressing direction of the bale pressing channel 1. This also allows the system to be mounted in a frame of a conventional baling press as an alternative for a tying system for making ties by twining ends of wire to each other.

Figure 5:
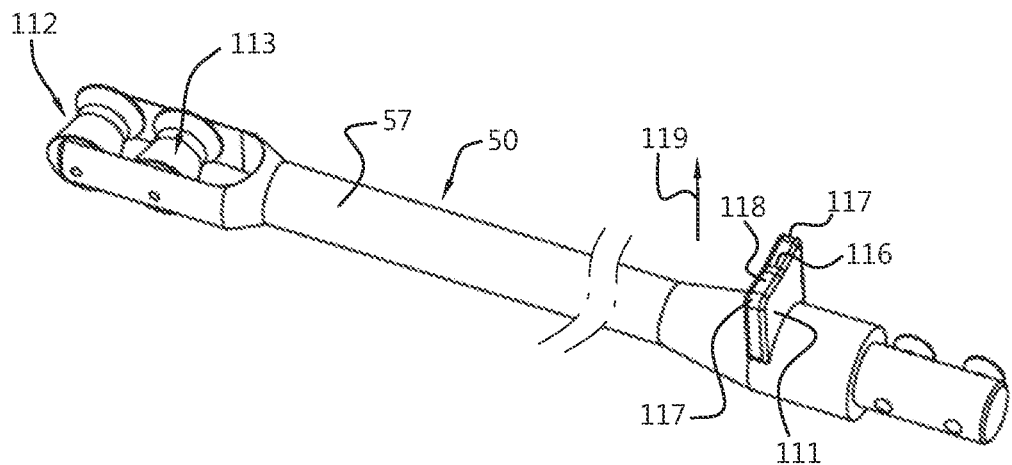
FIG. 5 is schematic perspective view of a distal part of the needle of the baling press shown in FIGS. 1-4.

For keeping the first and second rope materials 24, 25 reliably and accurately guided through the knotting area, the spreader 111 has a guide surface 116 (see FIG. 5) having end portions 117 and a central portion 118 between the end portions 117, the end portions being located further in a spreading direction 119, in which the portion of the trajectory 100, 101 in the knotting area 55 is spaced from the free end portion 53 of the loop supply member 50, than the central portion 118.

Figure 6:
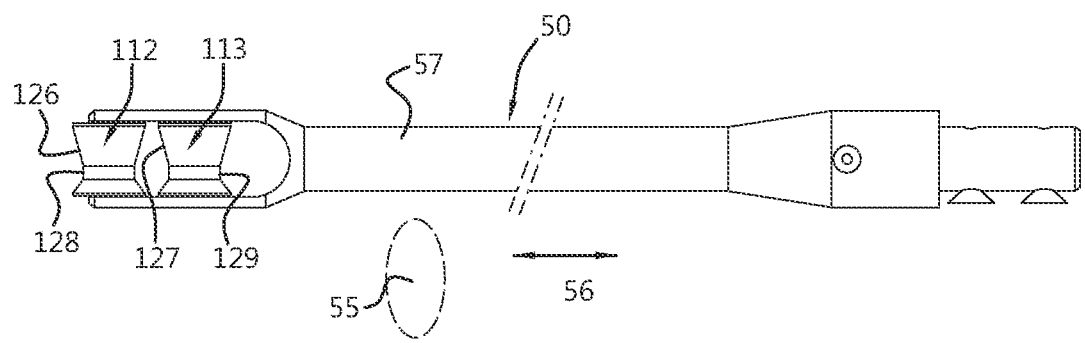
FIG. 6 is schematic side view of the distal part of the needle shown in FIG. 5.

As is best seen in FIG. 6, the turn guides 112, 113 have grooves 126, 127 for guiding the rope materials 24, 25. When the rope supply member 50 is in the extended position, the knotting area 55 is located laterally from and the grooves 126, 127 each have a deepest portion 128, 129 located axially offset towards the knotting area 55 from a center 130 of the respective groove 126, 127. This allows the first and second rope materials 24, 25 to be guided through the knotting area relatively close to the turn guides 112, 113 and allows the first and second rope materials 24, 25 to be tensioned at a small angle relative to the direction 56 of the path of movement of the rope supply member 50.

In this example, turn guides 112, 113 are in the form of sheaves, which is advantageous for reducing friction. However, the turn guides may also be stationary, in particular if low friction rope material is used. The grooves 126, 127 each have a width extending over the full width of the sheave 112, 113, so that rope material is reliably guided towards the deepest portion of the groove 126, 127 also if it is displaced relatively far to one side of the groove, for instance by one or more pieces of material projecting from a bale along which the rope material is tensioned.

When making a knot, starting from an end of rope material that has been pulled taut (i.e. in which no slack is left), it is necessary to pull some rope material towards the area where the knot is to be made. When baling harvested material like hay, the rope material can be tensioned around the bale for making the first knot 47 after completing a bale 20, which is then resiliently compressed. However, when baling other material, like waste plastic or paper, compressibility of the pressed bale 20 is quite small, so that the length of rope that can be made free for making a knot is often insufficient and too much tension is applied to the knotter 51. To solve this problem, the knotter 51 according to the present example further includes a rope material tensioning guide 93 positioned between the knot tying beak 91 and the bale pressing channel 1 for controlling tension in trajectories 100, 101 of the rope materials 24, 25 between the bale pressing channel 1 and the knot tying beak 91.

Figure 4:
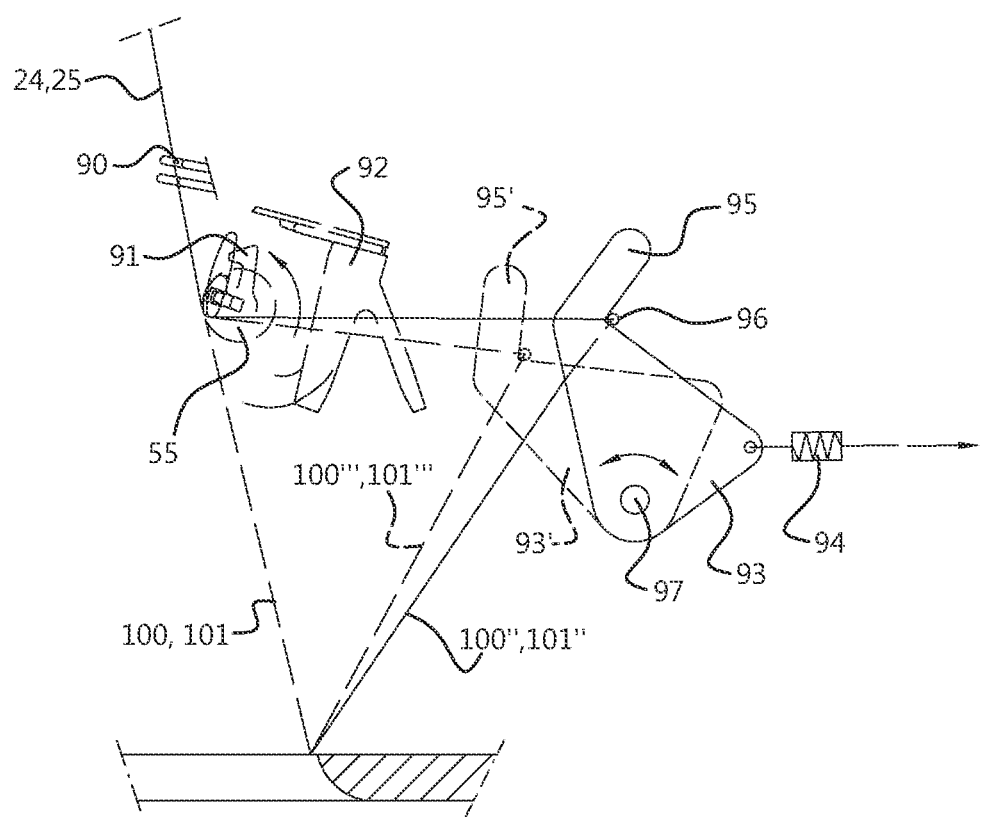
FIG. 4 is a schematic representation of the tensioning of rope material in a knotter of the baling press shown in FIGS. 1-3.

As is best seen in FIG. 4, the rope material tensioning guide 93 has a hook 95 hooking behind the first and second rope material 24, 25 and rotatable for pulling the first and second rope materials 24, 25 from the trajectories 100, 101 into diverted trajectories 100", 101", by rotating a shaft 97 holding the hook 95. When the rope materials 24, 25 have been pulled into the diverted trajectories 100", 101", the angle of an arc over which the rope materials 24, 25 pass over the knot tying beak 91 is increased for reliable engagement of the rope materials 24, 25 by the knot tying beak 91. The rope material 24, 25 is then also tensioned and a further length of rope materials 24, 25 is pulled into the trajectories 100", 101" between the knot tying beak 91 and the bale pressing channel 1. By means of the spring 94, the hook 95 is resiliently suspended. The resilient suspension of the hook allows some of the length of the trajectories 100", 101" to be used up in the knot made by the knot tying beak 91. The tensioning guide 93 then rotates to for example a position 93' with the hook in a position 95', which causes the remaining length of the trajectories 100", 101" to be shortened to trajectories 100''', 101'''. Thus, exerting too high loads onto the knotter 51 is avoided, while the first and second rope materials are held taut during knotting.

For easy and accurate adjustment of the knotter 51 relative to the baling channel 1 and the loop supply member 50, the knot tying beak 91, the cutter 92 and the rope clamp 90 are mounted to a common subframe 121 (schematically shown in FIGS. 2 and 3), the subframe 121 being adjustably positioned relative to the baling press channel 1 from which the loop supply member 50 is suspended. Thus, the position of the knotter can be adjusted without affecting the relative positions of the components of the knotter 51. In this example, also the tensioning guide 93 is mounted to the subframe 121.

The knot tying beak 91 is rotatable about an axis of rotation 40 for making a knot in the rope materials 24, 25. This axis of rotation 40 is oriented at an angle α smaller than 30°, preferably smaller than 25° and preferably larger than 15° (in the present example approximately 19°) relative to the bale pressing channel 1, for easy access to the knotter for inspection, maintenance and troubleshooting. Because the tensioning guide 93 is mounted to the subframe 121, the knot tying beak 91 can nevertheless be positioned close to the bale pressing channel.

The baling press according to the present example further has a first rope material supply guide 32 guiding the first rope material 25 along a supply trajectory having a first section 122 upstream of the first rope material supply guide 32. This first section 122 extends in pressing direction and towards the bale pressing channel 1. A second section 123 of the supply trajectory is oriented away from the bale pressing channel 1 and is also part of the loop formed by the loop supply member 50 (see FIG. 2). The first rope material supply guide 32 is movable in the bale pressing direction between a first position 32 upstream (in the bale pressing direction) of the path of movement of the loop supply member 50 between the extended position and the retracted position thereof and a second position 32' at least partially downstream (in the bale pressing direction) of the path of movement of the loop supply member 50. This allows the trajectories 100' and 101' of the first and second rope materials between the rope clamp 90 and the bale pressing channel 1 to pass through the knotting area 55 for making the second knot 48 (see FIG. 3).

A second rope material supply guide 30 is provided on the second side of the bale pressing channel 1 for guiding the second rope material 24 into the bale pressing channel 1 while the loop supply member 50 is extended into or through the bale pressing channel 1. Furthermore, a rope material diversion guide 115 is provided on the second side of the bale pressing channel 1. The rope material diversion guide 115 is movable in the bale pressing direction between a first position 115 downstream (in bale pressing direction) of the path of movement of the loop supply member 50 and a second position 115' at least partially upstream of the path of movement of the loop supply member 50. This allows most of the opening 77 to be closed off during pressing of a next bale to reduce bulging of pressed material out of the bale pressing channel 1.

Figure 7:
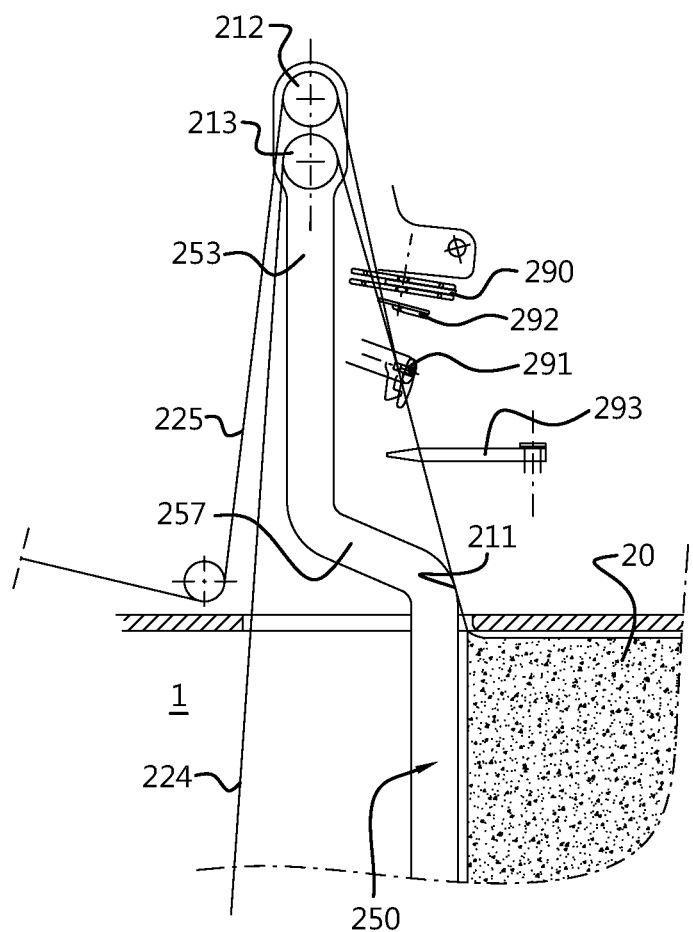
FIG. 7 is a side view of a knotting system and an adjacent pressing channel portion of a second example of a baling press according to the invention.

In FIG. 7 a part of an alternative example of baling press according to the invention is shown. In this example, the loop supply member 250 includes a rod 257 in which two curves curved in opposite directions of curvature are formed, the spreader 211 being mounted to a lower curve portion of the rod 257. Thus, a spacing is obtained between, on the one hand, the distal end portion 253 and, on the other hand, the trajectories between the turn guides 212, 213 and the bale pressing channel 1 of the first and second rope materials 224, 225 in the knotting area near the knot tying beak 291. A spacing between the distal end portion 253 and the trajectories between the turn guides 212, 213 and the bale pressing channel 1 of the first and second rope materials 224, 225 is thus also obtained at the rope clamp 290, the cutter 292 and the tensioning guide 293, so that also the parts can engage the rope materials while keeping clear from the rope supply member 250.

Several features have been described as part of the same or separate embodiments. However, it will be appreciated that the scope of the invention also includes embodiments having combinations of all or some of these features other than the specific combinations of features embodied in the examples.

The invention claimed is:

1. A baling press with a rope tying system for tying rope around pressed bales, the press comprising:
   a bale pressing channel oriented in a pressing direction;
   a ram reciprocally movable in the bale pressing channel for pressing material in the pressing direction through the bale pressing channel;
   at least one first rope feeding structure for feeding first rope material along a first feeding path on a first side of the bale pressing channel;
   at least one second rope feeding structure for feeding second rope material along a second feeding path on a second side of the bale pressing channel opposite of said first side of the bale pressing channel;
   for each pair of said first and second rope feeding structures:
   a knotter on said first side of the bale pressing channel, said knotter comprising:
      a knot tier for engaging sections of the first rope material fed along said first feeding path and of the second rope material fed along said second feeding path in a knotting area and knotting said sections to each other;
      a cutter for cutting off rope material from said sections knotted to each other; and
      a rope clamp for holding rope material cut off from the knotted rope sections, the knotting area being located closer to the bale pressing channel than the rope clamp; and
   a loop supply member for forming a loop of the second rope material across the bale pressing channel to said first side of said bale pressing channel and a loop of the first rope material at said first side;
   wherein said loop supply member is suspended on said second side of said bale pressing channel, said loop supply member is movable along a path between an extended position in which the loop supply member projects from said second side across said bale pressing channel to said first side of said bale pressing channel and a retracted position in which the loop supply member is fully on said second side of said bale pressing channel, and said loop supply member is guided so that said path is straight;
   wherein said loop supply member has at least one turn guide at a free end for forming and guiding said loops in said first and second rope materials; and
   wherein said loop supply member has a free end portion adjacent to said turn guide and a spreader for, when said loop supply member is in said extended position, holding said rope materials guided along trajectories extending from said turn guide through said knotting area towards said bale pressing channel, so that portions of said trajectories in said knotting area are spaced from said free end portion.

2. The baling press according to claim 1, wherein said free end portion of said loop supply member is elongated in a direction of movement of said loop supply member along said path between said extended position and said retracted position.

3. The baling press according to claim 2, wherein said loop supply member includes a rod which is straight and oriented in a direction of movement of said loop supply member between said extended position and said retracted position and wherein said spreader projects from said rod in a location between said knotting area and said bale pressing channel when said loop supply member is in said extended position.

4. The baling press according to claim 1, wherein said path of movement of said loop supply member is oriented in a direction perpendicular to the pressing direction of said bale pressing channel.

5. The baling press according to claim 1, wherein said spreader has a guide surface having end portions and a central portion between said end portions, said end portions being located further in a spreading direction, in which said portion of said trajectory in said knotting area is spaced from said free end portion, than said central portion.

6. The baling press according to claim 1, wherein turn guides of said at least one turn guide include grooves for guiding the rope material, the knotting area being located laterally from the rope supply member in extended position and the grooves each have a deepest portion located axially offset towards said knotting area from a center of the respective groove.

7. The baling press according to claim 6, wherein at least one of said turn guides is a sheave having a width and wherein a corresponding one of said grooves has a width extending over the full width of the sheave.

8. The baling press according to claim 1, wherein the knotter further comprises a rope material tensioning guide positioned between the knot tier and the bale pressing channel for diverting the rope materials between the knot tier and the bale pressing channel so as to increase an angle over which the rope material pass over the knot tier, wherein said rope material tensioning guide is resiliently suspended for controlling tension in the section of the rope materials between the bale pressing channel and the knot tier.

9. The baling press according to claim 1, wherein the knot tier, the cutter and the rope clamp are mounted to a common subframe, the subframe being adjustably positioned relative to the bale pressing channel.

10. The baling press according to claim 1, further comprising a first rope material supply guide guiding the first rope material along a supply trajectory having a first section upstream of the first rope material supply guide, the first section extending in pressing direction and towards the bale pressing channel and a second section oriented away from the bale pressing channel, the first rope material supply guide being movable in the bale pressing direction between a first position upstream of a path of movement of the loop supply member between the extended position and the retracted position thereof and a second position at least partially downstream of the path of movement of the loop supply member.

11. The baling press according to claim 10, further comprising a rope material diversion guide on the second side of the bale pressing channel, the rope material diversion guide being movable in the bale pressing direction between a first position downstream of the path of movement of the loop supply member and a second position at least partially upstream of the path of movement of the loop supply member.

12. The baling press according to claim 1, wherein said first side is a horizontally lateral side of said bale pressing channel.

13. The baling press according to claim 1, wherein the knot tier is rotatable about an axis of rotation oriented at an angle smaller than 30° relative to the bale pressing channel.

14. The baling press according to claim 1, wherein the knot tier is rotatable about an axis of rotation oriented at an angle smaller than 25° relative to the bale pressing channel.

* * * * *